United States Patent
Whelan

(10) Patent No.: US 12,515,891 B2
(45) Date of Patent: Jan. 6, 2026

(54) DISCHARGE HOPPER WITH FLOATING LOAD CELL SUPPORT TO FACILITATE FLOW CONTROL THROUGH PROPPANT HANDLING SYSTEM

(71) Applicant: Quickthree Technology, LLC, Yardley, PA (US)

(72) Inventor: Ronald Whelan, Fort Collins, CO (US)

(73) Assignee: Quickthree Technology, LLC, Yardley, PA (US)

( * ) Notice: Subject to any disclaimer, the term of this patent is extended or adjusted under 35 U.S.C. 154(b) by 52 days.

(21) Appl. No.: 18/732,727

(22) Filed: Jun. 4, 2024

(65) Prior Publication Data
US 2025/0368455 A1    Dec. 4, 2025

(51) Int. Cl.
| | | |
|---|---|---|
| B65G 47/18 | (2006.01) | |
| B65G 43/08 | (2006.01) | |
| B65G 47/42 | (2006.01) | |
| B65G 47/44 | (2006.01) | |

(52) U.S. Cl.
CPC ............ *B65G 47/42* (2013.01); *B65G 47/18* (2013.01); *B65G 47/44* (2013.01); *B65G 2203/0258* (2013.01); *B65G 2811/095* (2013.01)

(58) Field of Classification Search
CPC ........ B65G 47/18; B65G 47/42; B65G 47/44; B65G 43/08; B65G 2203/0258; B65G 2811/095
USPC .................................................. 198/524, 959
See application file for complete search history.

(56) References Cited

U.S. PATENT DOCUMENTS

| | | | | |
|---|---|---|---|---|
| 4,729,442 A | * | 3/1988 | Sichet | G01G 11/12 198/577 |
| 5,927,924 A | * | 7/1999 | Kemmer | G01G 11/003 414/21 |
| 6,313,414 B1 | * | 11/2001 | Campbell | G01G 19/08 73/1.13 |
| 6,472,615 B1 | * | 10/2002 | Carlson | G01G 13/024 177/60 |
| 11,261,033 B2 | * | 3/2022 | Nagai | G01G 19/393 |
| 11,873,160 B1 | * | 1/2024 | Oren | G01F 15/063 |
| 2019/0087918 A1 | * | 3/2019 | Lewis et al. | |
| 2021/0404303 A1 | * | 12/2021 | Hindman et al. | |

(Continued)

OTHER PUBLICATIONS

Benshaw Corporation, · Benshaw variable frequency drive. (RSI-060); 2016.

(Continued)

*Primary Examiner* — Douglas A Hess
(74) *Attorney, Agent, or Firm* — Sheehan Phinney Bass & Green PA

(57) ABSTRACT

Systems and methods are disclosed for receiving a continuing supply of proppant from a proppant conveyor through an inlet of a discharge box; enabling the continuing supply of proppant to move through the discharge box on one or more surfaces within the discharge box between the inlet and the outlet of the discharge box; repeatedly obtaining signals from a first plurality of load cells physically supporting the discharge box while the proppant moves through the discharge box, wherein each of the signals represents a weight, at a corresponding moment, of the discharge box and the proppant inside the discharge box; and controlling a speed of the proppant conveyor automatically based on the signals from the first plurality of load cells.

29 Claims, 12 Drawing Sheets

(56) References Cited

U.S. PATENT DOCUMENTS

| | | |
|---|---|---|
| 2022/0017310 A1 | 1/2022 | Herman et al. |
| 2022/0081231 A1* | 3/2022 | Knezevik et al. |
| 2024/0024801 A1* | 1/2024 | Coombe et al. |
| 2024/0116697 A1* | 4/2024 | Oren et al. |
| 2024/0327141 A1* | 10/2024 | Hagan et al. |
| 2025/0187818 A1* | 6/2025 | Dacar et al. |

OTHER PUBLICATIONS

Smart Sand, Inc.; "SmartPath Transloader—Operation Manual" Sep. 3, 2020.
Vega, "Vega Vibrating level switch. (Vegavib 61)"; Apr. 19, 2024.
Vega, "Vega Vibrating level switch. (Vegavib 63)"; Apr. 19, 2024.
Rice Lake Weighing Systems; "RL9000 Series Weigh Module Kit" Jul. 21, 2023.

* cited by examiner

DISCHARGE HOPPER WITH FLOATING LOAD CELL SUPPORT TO FACILITATE FLOW CONTROL THROUGH PROPPANT HANDLING SYSTEM

FIELD OF THE INVENTION

This application relates to proppant handling and, more particularly, relates to a load cell supported proppant guide surface to facilitate flow control through proppant handling equipment.

BACKGROUND

Hydraulic fracturing (or fracking) refers to a well stimulation technique that involves injecting high-pressure fracking fluid into a wellbore to create cracks in deep-rock formations through which petroleum resources, such as oil or natural gas, can flow. Fracking fluid may vary in composition depending on a variety of considerations and the specific application to which the fracking fluid is to be applied. Fracking fluids, however, typically contain sand or some other proppant that is designed to keep any fractures produced by the fracking process open particularly after the fracking fluid has been withdrawn from the well.

Proppant for fracking is typically delivered to a well site (e.g., near the well head), stored temporarily at the work site, then, at an appropriate time, blended together with other components of the fracking fluid to form the end product to be injected into the wellbore.

Demand is high and growing for a reliable and sometimes continuous supply of proppant for blending at well sites.

SUMMARY OF THE INVENTION

Systems and methods are disclosed for receiving a continuing supply of proppant from a proppant conveyor through an inlet of a discharge box; enabling the continuing supply of proppant to move through the discharge box on one or more surfaces within the discharge box between the inlet and the outlet of the discharge box; repeatedly obtaining signals from a first plurality of load cells physically supporting the discharge box while the proppant moves through the discharge box, wherein each of the signals represents a weight, at a corresponding moment, of the discharge box and the proppant inside the discharge box; and controlling a speed of the proppant conveyor automatically based on the signals from the first plurality of load cells. The phrase "continuing supply," in this regard, refers to a supply is ongoing or persistent, but not necessarily unbroken or uninterrupted. The phrase "repeatedly obtain" refers to obtaining again and again. This should be understood broadly to include regular periodic obtaining, irregular sampling, or continuous sampling.

In a typical implementation, the proppant conveyor is physically supported independent from the discharge box. In a typical implementation, each of the first plurality of load cells is beneath, and physically supports the discharge box, in such a manner that the load cells collectively support the entirety of the discharge box, but only the discharge box.

In some implementations, the first plurality of load cells includes three spaced apart load cells, and wherein each respective load cell is in physical contact with and supported by a support pad on a support frame for the discharge box. However, more load cells than that may be used.

In certain implementations, the inlet of the discharge box is an opening at a top of the discharge box configured to receive the continuing supply of proppant via a gravity drop from an outlet of the proppant conveyor and the outlet of the discharge box is an opening at a bottom of the discharge box. The outlet of the discharge box is at least partially offset in a horizontal direction from the inlet of the discharge box. As such, a downwardly-sloped internal surface can extend from the inlet to the outlet. In some implementations, enabling the continuing supply of proppant to move through the discharge box on the one or more surfaces within the discharge box between the inlet and the outlet of the discharge box comprises: enabling the continuing supply of proppant to land on a first portion of a surface inside the discharge box after passing through the inlet, slide along a downwardly slanted portion of the surface under the influence of gravity to the outlet of the discharge box, so that the proppant can then exit the discharge box through the outlet. In a typical implementation, the method includes capturing the continuing supply of proppant exiting the discharge box through the outlet of the discharge box in a blender hopper beneath the outlet of the discharge box.

The methods disclosed herein typically include providing a plurality of silos adjacent to the blender hopper, where each silo is configured to deliver proppant into the blender hopper via gravity through a silo discharge chute. Proppant is typically received at the proppant receiver through repeated proppant deliveries from a sequence of delivery trucks. Repeated means that the trucks arrive and dump their loads of proppant one at a time, sequentially, into the proppant receiving system, which is configured to temporarily hold the proppant in a proppant storage container. The proppant may then be gravity dropped from the proppant storage container into the proppant conveyor.

The systems and techniques disclosed herein typically provide for monitoring a proppant level in the proppant storage container with a first proppant level sensor inside the proppant storage container. Operation of the proppant conveyor may be paused automatically in response to an indication from the first proppant level sensor that the proppant level in the proppant storage container has dropped to a first level. Subsequently, operation of the proppant conveyor may be restarted automatically in response to an indication from the first proppant level sensor that the proppant level in the proppant storage container has been restored.

In some implementations, the proppant receiving system includes a proppant unloading station; a mechanical conveying system configured to convey proppant from the proppant unloading station to a discharge that is higher than the proppant unloading station; and the proppant storage container with an inlet opening configured to receive proppant from the discharge of the mechanical conveying system and to temporarily hold the proppant. In such implementations, the method further comprises: receiving proppant from one of the repeated proppant deliveries in the proppant unloading station of the proppant receiving system; and conveying the proppant from the proppant unloading station to the inlet of the proppant storage container. The method, in some implementations, includes conveying the proppant from the proppant storage container to the discharge box with the proppant conveyor, where the proppant passes through the discharge box and into the blender hopper. The method, in some implementations, further includes conveying the proppant from the proppant storage container to any one or more of a plurality of silos located adjacent to the blender hopper via a pneumatic conveyor system, where each of the plurality of silos has a discharge chute configured to discharge proppant into the blender hopper.

In certain implementations, the systems and techniques disclosed herein provide for sensing a proppant level in the proppant storage container with a second proppant level sensor inside the proppant storage container. The method, in some instances, includes causing one or more of the silos to deliver proppant into the blender hopper in response to the proppant level sensor indicating that the proppant level in the proppant storage container has dropped to a first predefined level. The method, in some instances, includes causing the proppant conveyor to stop in response to the proppant level sensor indicating that the proppant level in the proppant storage container has dropped to the first predefined level. The method, in some instances, further includes causing the one or more silos to cease delivering proppant into the blender hopper and/or causing the proppant conveyor to restart in response to the proppant level in the proppant storage container becoming filled to a second predefined level.

In some implementations, the method includes driving a motor for the proppant conveyor with an adjustable speed drive. In such implementations, controlling the speed of the proppant conveyor may include transmitting an output signal from each of the first plurality of load cells to a computer-based controller; producing a drive control signal, corresponding to the load cell output signals, at the computer-based controller; and transmitting the drive control signal to the adjustable speed drive. In some such implementations, producing the drive control signal at the computer-based controller comprises: combining (e.g., averaging) the load cell output signals from each of the first plurality of load cells to produce a combined signal, where the drive control signal is based on (e.g., is or is proportional to) the combined signal.

In some implementations, the proppant conveyor includes an impact scale that comprises a second plurality of load cells. The method in some of those instances, further includes passing proppant from the continuing supply of proppant through the impact scale prior to exiting the proppant conveyor (and prior to entering the discharge box).

In another aspect, a proppant handling system includes a discharge box; and a proppant conveyor configured to provide a continuing supply of proppant to a blender hopper via a discharge box. The discharge box includes a housing that defines an inlet and an outlet; and one or more surfaces inside the housing, wherein the one or more surfaces accommodate a flow of the proppant, under the influence of gravity, along the one or more surfaces through a portion of the discharge box between the inlet and the outlet. A plurality of load cells physically supports an entirety of the discharge box (e.g., atop a support frame). Each of the plurality of load cells is configured to produce a time varying signal or sequence of signals that represents a time varying weight of the discharge box and a portion of the continuous supply of proppant inside the discharge box at specific times. A control system is configured to adjust a speed of a motor driving the proppant conveyor in response to and in accordance with the time varying signal or sequence of signals from the load cells.

In a typical implementation, the proppant conveyor is physically supported independently from the discharge box and without involvement from the plurality of load cells. In some such systems, the system further includes the blender hopper, which is configured to receive proppant from an outlet of the discharge box and is physically supported independently from the discharge box and also without involvement from the plurality of load cells.

In certain implementations, the proppant handling system includes a proppant storage container configured to gravity dump proppant into the proppant conveyor; and a first proppant level sensor inside the proppant storage container. In some such implementations, the control system is configured to pause operation of the proppant conveyor automatically in response to an indication from the first proppant level sensor that a proppant level in the proppant storage container has dropped to a first level, and restart operation of the proppant conveyor automatically in response to an indication from the proppant level sensor that the proppant level in the proppant storage container has been restored.

The proppant handling system, in some implementations, further includes a proppant storage container configured to gravity dump proppant into the proppant conveyor and a second proppant level sensor inside the proppant storage container. In some such implementations, the control system is configured to cause one or more of the silos to deliver proppant into the blender hopper in response to the second proppant level sensor indicating that the proppant level in the proppant storage container has dropped to a first predefined level, and cause the proppant conveyor to stop in response to the second proppant level sensor indicating that the proppant level in the proppant storage container has dropped to the first predefined level. In certain implementations, the control system is further configured to cause the one or more silos to cease delivering proppant into the blender hopper; and/or cause the proppant conveyor to restart—in response to the proppant level in the proppant storage container being restored.

The one or more surfaces inside the housing of the discharge box, which accommodate the flow of the proppant, may have a first section beneath the inlet and configured to receive proppant that enters the housing through the inlet; and a downwardly slanted section that connects the first section to a second section, where the second section is adjacent to the outlet.

The proppant handling system may further include a support frame for the conveyor discharge box. The support frame defines a plurality of spaced-apart support pads. Each respective one of the plurality of loads cells may sit atop a corresponding one of the support pads.

In some implementations, one or more of the following advantages are present.

For example, the systems and techniques disclosed herein reliably provide large amounts of readily available proppant at a wellsite. The systems and techniques typically include significant redundancy and are robust, yet flexible. The systems are easy to maintain, relatively inexpensive and straightforward. Moreover, the amount of human support required to operate such systems may be reduced by implementing the systems and techniques disclosed herein.

Other features and advantages will be apparent from the description and drawings, and from the claims.

BRIEF DESCRIPTION OF THE DRAWINGS

Like reference characters refer to like elements.

DETAILED DESCRIPTION

Figure 1A:
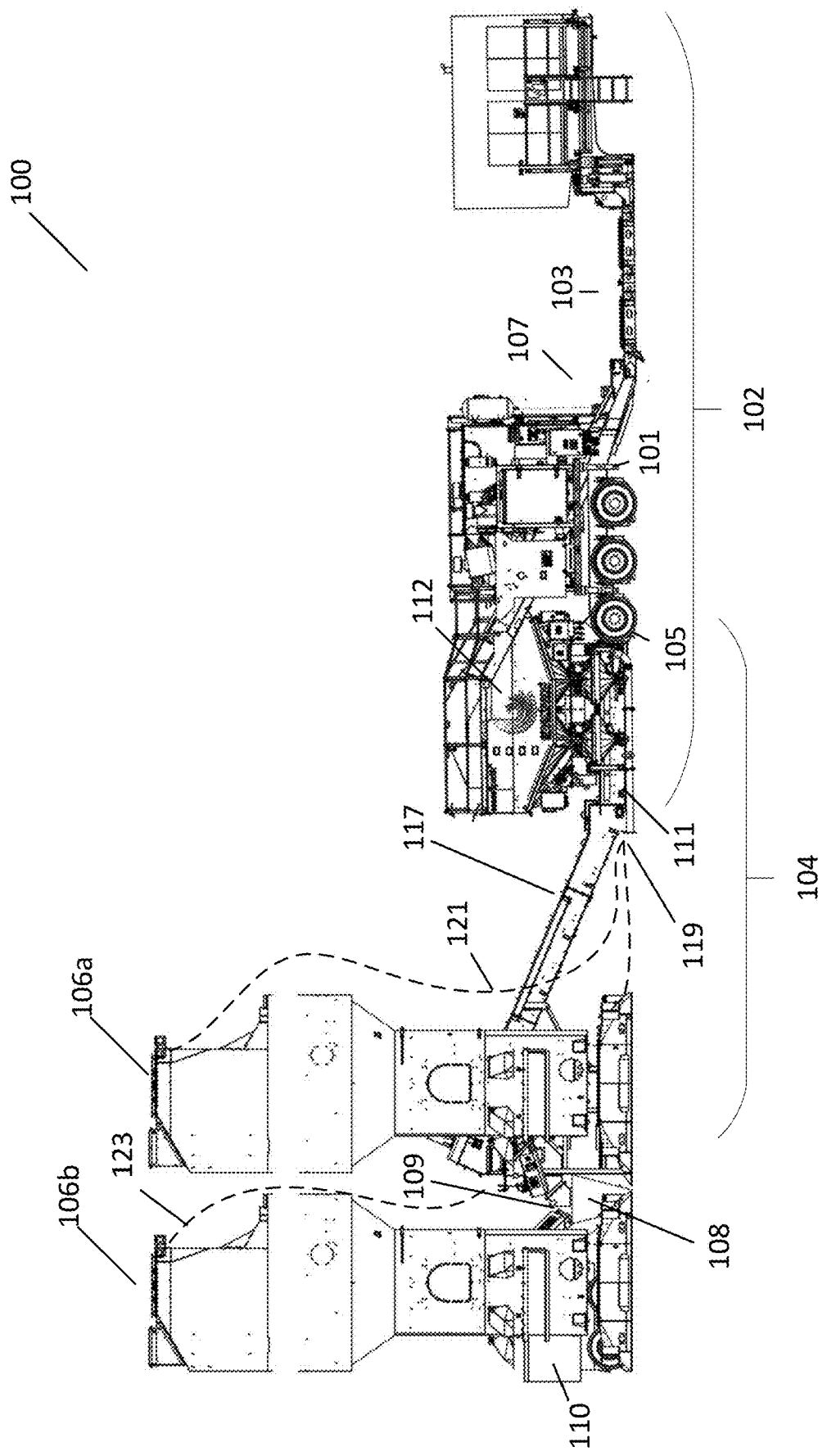
FIG. 1A is a side view of an implementation of a system for receiving, storing, and supplying proppant into a blender hopper at a worksite.

Hydraulic fracturing (or fracking) refers to a well stimulation technique that involves injecting high-pressure fracking fluid into a wellbore to create cracks in deep-rock formations through which petroleum resources, such as oil or natural gas, can flow. Fracking fluid may vary in composition depending on a variety of considerations and the specific application to which the fracking fluid is to be applied. Fracking fluids, however, typically contain sand or some other proppant that is designed to keep fractures produced by the fracking process open particularly after the fracking fluid has been withdrawn from the well.

Proppant intended to support fracking activities may be delivered to a well site (e.g., near the well head) in trucks, stored temporarily at the work site, then, at an appropriate time, introduced into a blender for blending with other components to form a fracking fluid, which is injected into the wellbore. Demand is high and increasing for a reliable, often continuous or almost continuous, supply of proppant to a blender at various well sites. In various implementations, the systems and techniques disclosed herein facilitate satisfying that varying demand.

Various implementations of the systems disclosed herein provide for high capacity storage of proppant at a well head in a manner that facilitates fast delivery into a blender at the well head in a reliable manner. For onsite proppant storage, implementations of the systems disclosed herein include a blender hopper, a plurality of silos, a proppant storage container, as well as other system components that may contain smaller amounts of proppant during system operation-all on site, in close proximity to the blender and the well head.

Ensuring a readily available supply of proppant for an onsite blender hopper can be critical to successful fracking operations. This requires not only high capacity onsite storage capabilities, but also, traditionally, involves the cooperative effort of multiple skilled onsite workers. Various implementations of the systems and techniques disclose herein provide for unique approaches in automation that involve creative configurations of system components, sensors, control elements, etc. The advantages realized in this regard include a reduced need for onsite human support and may be provided through a robust, reliable, low maintenance, low cost, safe, and clean system configuration and configuration of system components.

It is important to note that proppant delivery times can sometimes be unreliable or irregular. As mentioned, trucks typically deliver proppant to well sites. Each truck may pull into the well site, deliver its load of proppant (e.g., via gravity dump or some other conveying technique) into a proppant receiver (e.g., a system, such as the SmartPath™ unloading system, available from Smart Sand, Inc., the applicant on the current application) configured to receive and temporarily store proppant at the wellsite, then drive off. In times of high demand or times when a system needs replenishing, it may be desirable that, as one emptied truck pulls away from the proppant receiver, another loaded truck pulls up immediately to the proppant receiver for a subsequent, almost immediate, second delivery. In good circumstances, this may continue, for example, with a relatively steady stream of trucks delivering, one after another, into the proppant receiver, particularly at a high demand well site. In fact, at very high demand well sites, it is not unusual for multiple trucks to be lined up, in a queue, ready to deliver their loads of proppant into the proppant unloading system at the well site, so that each truck can pulls in and dump its delivery as soon as the prior truck pulls away. This can help ensure a relatively steady and high rate of proppant delivery to the well site to help to satisfy a high demand for proppant in the well and the blender. That said, numerous obstacles can make it difficult for trucks to reach their intended well site destinations at desired times. These obstacles can include, for example, traffic conditions, mechanical failures, physical limitations of the drivers, challenges with loading trucks with proppant for delivery, and/or legal restrictions (restricting, e.g., where and when trucks might be allowed to drive).

Implementations of the systems and techniques disclosed herein are particularly well suited for managing and adapting to circumstances that may arise due to a lack of sufficient or regular proppant deliveries via truck. These adaptations, as described herein, are largely automated and leverage the high storage capacity available in a typical implementation of the systems described herein.

It is further desirable that proppant handling systems be robust and highly reliable. In a typical implementation, the proppant handling systems disclosed herein are just that-robust and highly reliable. They provide any one of several advantages while being easy to maintain, with certain sensors, for example, positioned away from the proppant moving through the system. As a result, the systems enjoy little unplanned downtime or interruptions, which, in such systems, particularly at busy well sites, can be very costly. The overall structure of each system component can be robust and reliable, which, especially if properly maintained, can help avoid or at least minimize unplanned downtime or interruptions and, thereby further support the aim of the meeting the high and growing demand for proppant at well sites, and reduce maintenance efforts and cost.

Additionally, in a typical implementation, the systems and techniques disclosed herein may reduce overall operating costs (e.g., by eliminating the need for certain human operator interventions by automating certain aspects of system operation). Various functional aspects of the systems and techniques disclosed herein are automated to help ensure a high level of availability of proppant at the blender hopper regardless of circumstances and for relatively operating and maintenance costs.

The systems disclosed herein are relatively simple in terms of construction and operation, which contributes to low cost and requirements for human operator intervention. System maintenance also is very straightforward and easy to do, when needed, which may be rarely. Moreover, the systems may be deployed in a compact manner having an overall footprint that is small, particularly given the various functionalities, storage capacity, and operational and cost advantages of the system. Additionally, in a typical implementation, flow control through the system can be tightly controlled to help ensure that the primary proppant supply channel to the blender hopper is able to provide an adequate supply of proppant at all (or at least most) times to accommodate varying system demand. This may help ensure that any backup proppant supply sources (e.g., one or more silos adjacent the blender hopper) remain available, and to the fullest extent possible, so that most likely system demand can be satisfied even if the primary proppant source fails or becomes unavailable for a period of time. This increases overall system reliability, which is particularly important given the increasing, and varying over time, demand for proppant, and the resulting proppant slurry, at the well head and in the well bore, sites to support fracking operations. It also helps automate functionalities that may otherwise require a significant amount of monitoring and input from a human operator to ensure an appropriate degree of proppant flowing to the blender hopper. Many other advantages are possible.

Figure 1B:
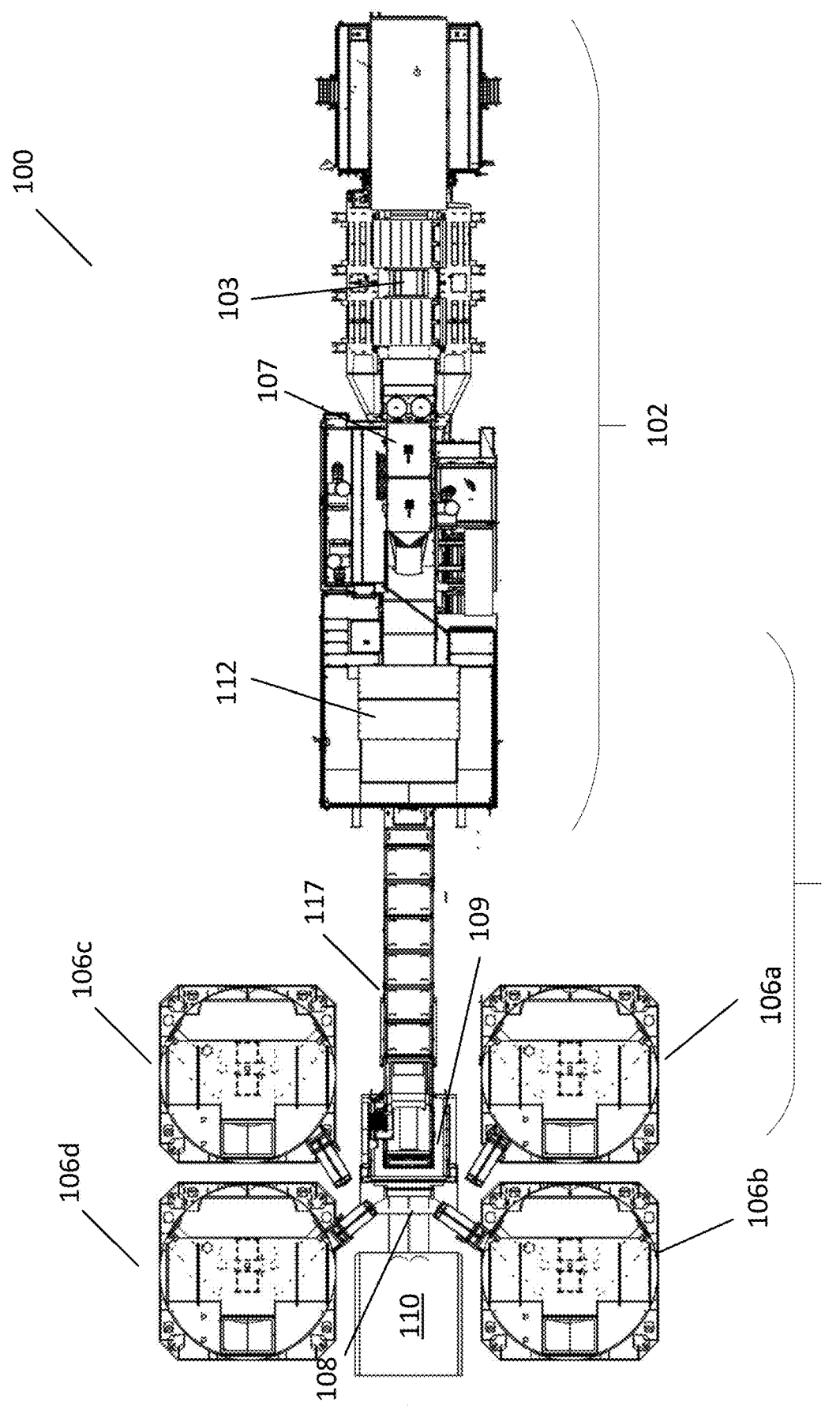
FIG. 1B is a top view of the system in FIG. 1A.

FIGS. 1A and 1B show an exemplary implementation of a system 100, in which the inventive systems and techniques disclosed herein may be implemented. Specifically, the illustrated system 100 is configured for receiving and storing proppant, and for supplying the proppant into a blender hopper 108 for a blender unit 110. Typically, the system 100 may be deployed onsite, i.e., at, or in very close proximity to, the well head of a fracking well, so that the solid-liquid slurry (or fracking fluid) produced in the blender unit 110 can be delivered promptly into the well head, as needed, to meet a high, and often varying demand. The blender unit 110 utilizes the proppant that is supplied by the system 100 to produce the fracking fluid that typically ends up getting pressure injected (utilizing a pumping system, not shown) into the well bore to enhance well productivity and support fracking operations.

The system 100 includes a proppant receiver 102, a mechanical conveyor 104, a discharge box 109 for the mechanical conveyor, and a plurality of silos 106a-106d. At the outset, it should be made clear that the system in FIG. 1 is but one example of a system where the systems and techniques disclosed herein may be deployed. Numerous variations are possible. Indeed, any one or more of the individual components of the system 100 shown in FIGS. 1A and 1B could be replaced with a different component(s) that is (are) physically different than but that perform(s) substantially similarly as the component(s) shown. Likewise, the system and techniques disclosed herein may be advantageously deployed in other material handling applications including, for example, ones not specifically related to supplying proppant for a fracking operation. Additionally, the physical arrangement of components relative to one another may be varied as well whether or not the components are varied.

At a high level, the illustrated system 100 is configured to adequately satisfy the proppant requirements of any fracking operation, which may vary drastically over time, and may be quite onerous at times. The system 100, in a typical implementation, achieves this by providing high onsite storage capacity close to the well head, multiple parallel supply channels for proppant into the blender hopper 110, and automated control to minimizing the likelihood of system 100 downtime due to a lack of available proppant and by maximizing the likelihood that proppant will be available, and in the amount needed, at the blender hopper to support the varying, and often high demand.

The proppant receiver 102 is a transportable system component that typically is positioned at the work site (e.g., near the well head of a fracking operation). The illustrated proppant receiver 102 has a proppant unloading station 103, a mechanical conveying system 107, the proppant storage container 112, and a pneumatic conveying system 111. The proppant receiver 102 is configured to receive deliveries of proppant at the work site, typically delivered by truck (and gravity dumped into the proppant unloading station 103 of the proppant receiver 102), automatically move the delivered proppant from the proppant unloading station 103 into a proppant storage container 112 ("surge bin") for temporarily storage therein. The proppant storage container 112 is configured to discharge the proppant via gravity (e.g., onto a moving belt of a separate mechanical conveyor 117) or via a pneumatic conveying system 111 on the proppant receiver 102 (e.g., to one or more of the silos 106a-106d).

The illustrated proppant receiver 102 has a chassis 101 supported on wheels 105. The front end of the chassis 101 can be connected to a truck or other vehicle for hauling around as desired or needed. All other proppant receiver 102 components shown in the illustrated implementation are mounted, either directly or indirectly, onto and physically supported by the chassis 101.

The proppant unloading station 103 is configured so that a bottom dump trailer can be driven over the proppant unloading station 103 and can deliver proppant (e.g., via gravity drop) into an opening in a housing of the proppant receiver 102 that defines a receiving portion of the proppant unloading station 103. In a typical implementation, the proppant receiver 102 has a drive-over ramp assembly (not shown) with ramp panels that are movable (e.g., about hinged connections) between a stowed position and a deployed position. In the stowed position, the ramp panels may extend in a substantially upward (and slightly inward) direction. In the deployed position, the ramp panels may extend laterally outward and downward so that their distal ends rest on the ground, thereby forming a ramp, over which a proppant delivery vehicle can drive to align its bottom dump discharge port with the opening in the housing of the proppant receiver 102 at the proppant unloading station 103.

Typically, any proppant dropped into the opening in the housing at the proppant unloading station 103 lands on one or more movable belts of the mechanical conveying system 107. The mechanical conveying system 107 in a typical implementation utilizes mechanical components (e.g., one or more conveyor belts) to convey the proppant from the proppant unloading station 103 to an inlet of the proppant holding container 112. The inlet of the proppant holding container 112, in the illustrated implementation, is an opening in a housing of the proppant holding container at or near the top of the housing of the proppant holding container 112. More specifically, in a typical implementation, the one or more conveyor belts of the mechanical conveying system 107 deliver the proppant to a position above the inlet and proppant drops off a distal edge of the one or more conveyor belts and into the opening. As shown, the mechanical conveying system 107 receives the gravity dumped proppant at a relatively flat, horizontal section of the mechanical conveying system, and the belt(s) follow(s) an upwardly angled path after the proppant unloading station 103 and toward the inlet of the proppant holding container 112.

The proppant holding container 112 includes a large, hollow, rigid container. In one implementation, the proppant holding container 112 has a storage capacity of approximately 40 tons. In another implementation, the proppant holding container 112 has a storage capacity of approximately 40 tons. Other storage capacities are possible as well. The proppant holding container 112 has an opening at or near the top of its housing that allows proppant conveyed by the mechanical conveying system 107 to fall into the proppant holding container 112. The proppant holding container 112 is typically used for temporary proppant storage, to supply proppant into the mechanical conveyor 117 (via gravity dump), and/or to supply proppant, as needed, into the pneumatic conveying system 111 for delivery to one or more (or all) of the silos 106a-106d.

In a typical implementation, the proppant holding container has one or more level sensors (not shown in FIGS. 1A and 1B, but see 770a, 770b in FIG. 7) that is/are configured to sense a level of proppant in the proppant holding container 112. A variety of specific configurations, sensors and/or sensor types may be utilized to sense the level or proppant in the proppant holding container 112. In one exemplary implementation, a level sensor is attached to the housing of the proppant storage container 112 and extends into the proppant storage space of the proppant storage container 112. In some implementations, there may be another (or more than one other) level sensor(s) inside the proppant storage container. Each level sensor may be virtually any kind of sensor that is capable of sensing proppant level in accordance with the description contained herein. In certain implementations, at least one of the level sensors is a VEGAVIB™ 63 vibrating level switch with tube extension for granular bulk solids, available from Vega Americas, Inc. of Mason Ohio.

The VEGAVIB™ 63 vibrating level switch is a level switch for granular and coarse-grained bulk solids that is configured to detect minimum or maximum limit levels. The VEGAVIB™ 63 vibrating level switch operates on the vibration principle. More specifically, it is equipped with a vibrating element (e.g., a rod) that operates as a sensor element. The vibrating element is energized piezoelectrically and vibrates at its mechanical resonance frequency. When the vibrating element is immersed in proppant (or if the proppant level drops to uncover the vibrating element), the vibration frequency changes. This change is detected by an integrated electronics module for the vibrating level switch and converted into a switching command. The position of the switching point in a VEGAVIB™ 63 vibrating level switch is typically specified through the tube extension.

In the illustrated system 100, there are two primary ways in which proppant may be discharged from the proppant storage container 112 during system operation. First, the proppant may be dumped (via gravity) out of a discharge opening at the bottom of the proppant storage container 112. In the illustrated system 100, any proppant dumped via gravity in this manner is directed to land on one or more conveyor belts of the mechanical conveyor 117. In this regard, the dropped proppant may fall through an opening in a housing of the mechanical conveyor 117 immediately beneath any such gravity dump discharge on the proppant storage container 112.

Second, the proppant may be introduced into the pneumatic conveying system 111 that uses pneumatic pressure (e.g., from two 100 HP blower motors on the proppant receiver 102) to convey the proppant to one or more discharge lines 119 near a rear of the system 100. In a typical implementation, a hose or pipe can be attached to the discharge 1109 of the pneumatic conveying system 111 to carry the discharged proppant to an on-site storage container, such as one of the silos 106a-106d or the like. An air lock (or functionally similar structure(s)) may be provided between the proppant storage container 112 and the pneumatic conveying system 111 to allow the proppant to move from the proppant holding container 112 into the pneumatic conveying system 111 without compromising the pressure differential between the proppant holding container 112 and the pneumatic conveying system 111.

The proppant holding container 112 in the illustrated system 100 has a lower surface that forms multiple hoppers, each with its own discharge opening (or outlet) at its bottom. In some implementations, the discharge opening at the bottom of the hopper may be gated or otherwise controllable (e.g., with a valve or the like) to enable independent regulation or control of proppant flow out of the proppant holding container 112 through each opening. One or more of the discharge openings may be configured to dump proppant directly into an opening in the housing of the mechanical conveyor 117 (so that the proppant so dropped lands on the moving conveyor belt(s) in the mechanical conveyor 117). Another one or more discharge openings may be configured to deliver proppant from the proppant holding container 112 into a pneumatic conveying line of the pneumatic conveying system 111, for delivery to one or more of the silos 106a-106d, via pneumatic lines 121, 123 (shown with dashed lines in FIG. 1). These pneumatic lines 121, 123 may be attached to flanged openings at the pneumatic conveying system's discharge 119 and run to (and typically connected to) corresponding openings at the silos 106a-106d.

The mechanical conveyor 117, in the illustrated implementation, is configured with a first section, a second section, and a third section. The first section of the mechanical conveyor 117 is relatively flat and extends, substantially horizontally, beneath the proppant storage container 112. The housing of the first section defines an opening in its upper surface, through which proppant from the proppant storage container 112 can be dropped onto a conveyor belt inside a housing of the mechanical conveyor 117. The second section of the mechanical conveyor 117 is inclined relative to the first section and is configured to convey proppant, e.g., via conveyor belt, from the first section to a third section that is higher than the first section. The second section is typically enclosed within the housing. The third section is at the top of the second section and is configured to drop the proppant off a distal end of the belt(s), typically, passing through an opening in the housing at the upper end of the mechanical conveyor 117. The third section of the mechanical conveyor 117 drops the proppant through a drop chute portion of the mechanical conveyor 117 down into the discharge box 109 located beneath an outlet of the mechanical conveyor 117.

An impact scale (not shown in FIGS. 1A and 1B, but see 338 in FIG. 3A) is immediately downstream from and beneath a discharge of the mechanical conveyor 117, and immediately upstream of and above the discharge hopper 109. In a typical implementation, the impact scale may use readings from load cells (or other sensing elements), for example, to determine a quantity of proppant flowing into the blender hopper 108. In a typical implementation, data from the impact scale may be transmitted and logged to a system data van, and may be checked against delivery records showing how much proppant has been delivered, via truck, into the proppant receiver 102.

Figure 2A:
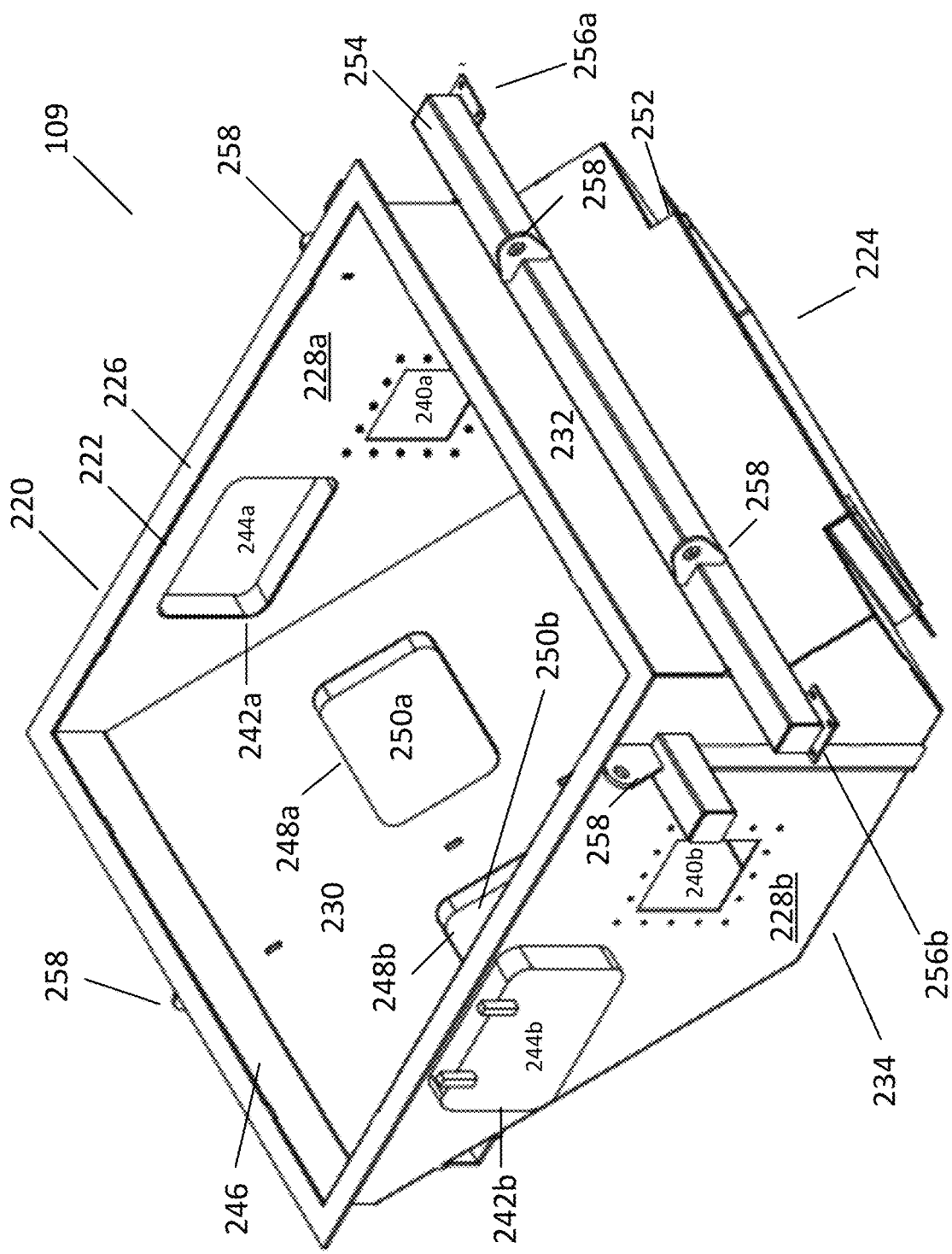
FIG. 2A is a perspective view of an implementation of a discharge box.
Figure 2B:
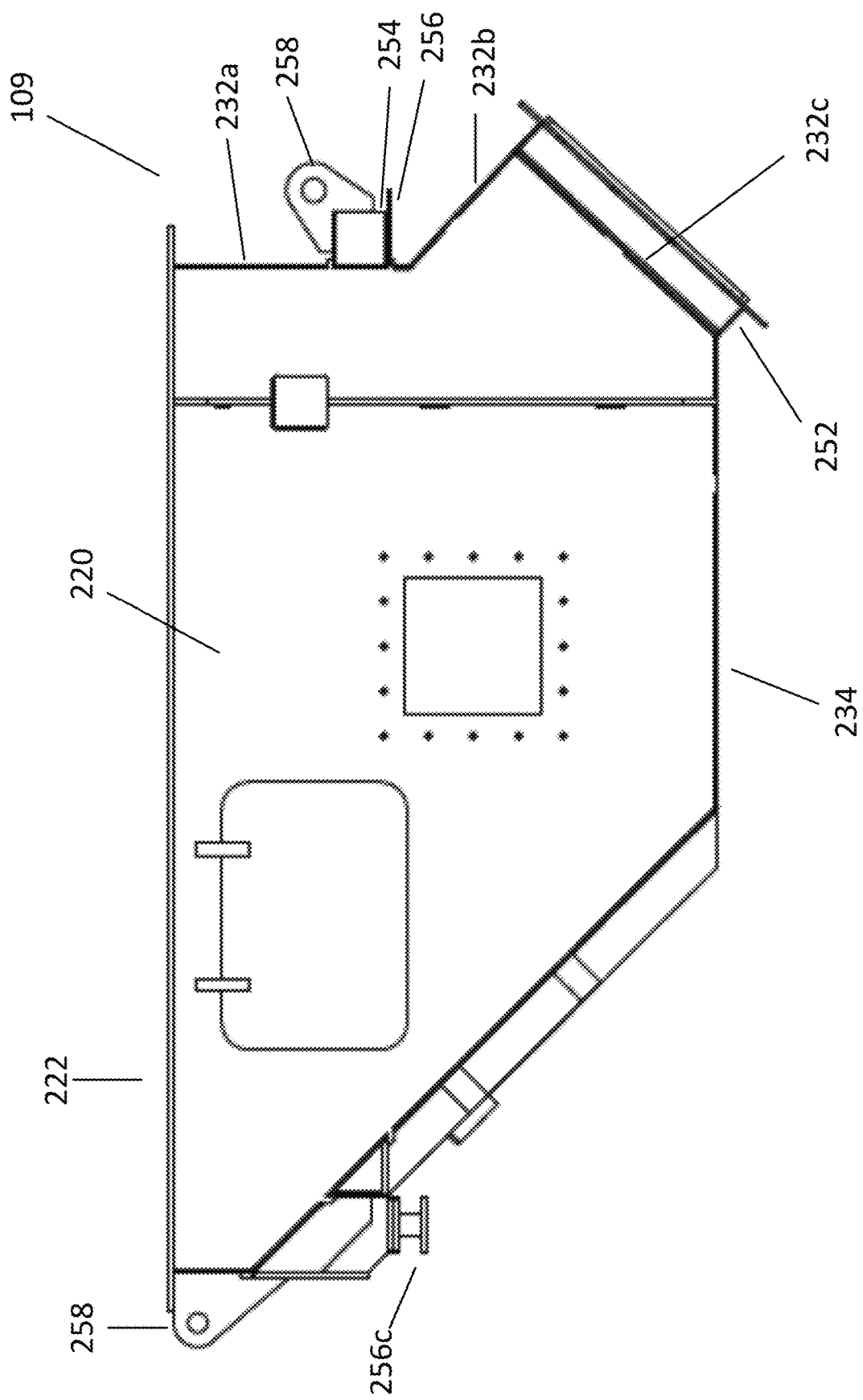
FIG. 2B is a side view of the discharge box in FIG. 2A.

FIGS. 2A and 2B show an exemplary implementation of discharge hopper 109. The illustrated discharge hopper 109 has a housing 220 that defines an inlet 222 and an outlet 224.

The inlet 222 lies in an inlet plane, faces upward and is surrounded by an outwardly flanged surface 226 that also lies in the inlet plane. The inlet plane is disposed horizontally in the illustrated example, which is typical. The housing 220 in the illustrated example includes five major panels: two side panels 228a, 228b, a sloped rear panel 230, a front panel 232, and a bottom panel 234.

The two side panels 228a, 228b are parallel to one another and extend in a vertically downward direction from side portions of the flanged surface 226. Each side panel 228a, 228b has a first opening 240a, 240b that is typically covered by a transparent viewing window. The transparent viewing window allows a human operator, for example, to see through the first opening into the housing 220 of the discharge hopper 109 to confirm the flow of proppant through the discharge hopper 109, for example. Each side panel 228a, 228b has a second opening 242a, 242b that is typically covered by a cover 244a, 244b that is typically not transparent, but that is easily removable by hand or with a hand tool (e.g., to facilitate access to the interior of the discharge hopper 109 for maintenance, repair, etc., if needed). Aside from the two openings 240a, 240b and 242a, 242b, each of the side panels 228a, 228b in the illustrated implementation defines a continuous, substantially smooth inner surface that extends to and between the sloped rear panel 230, the bottom panel 234, the front panel 232, and the upper flanged surface 226. The inner surfaces of the side panels 228a, 228b in the illustrated implementation are parallel to one another and perpendicular to the inlet plane.

A short panel 246 extends in a vertically downward direction from an inner edge of the rear portion of the flanged surface 226 that surrounds the inlet 222 of the discharge hopper 109. The sloped rear panel 230 extends, in a sloped manner, from a bottom edge of the short panel 236, to a rear edge of the bottom panel 234 of the discharge hopper 109. The angle of the sloped rear panel 230 relative to horizontal, in the illustrated implementation, is 45 degrees. Of course, the slope can be disposed at an angle that is different than 45 degrees. In various implementations, the angle may be any angle within a range of angles (e.g., 40 degrees to 50 degrees, 35 degrees to 55 degrees, 30 degrees to 60 degrees, etc.) as long as the rear panel 230 slopes in a downward manner (e.g., from the lower edge of the short panel 246 at the rear of the discharge hopper 109 to the rear edge of the bottom panel 234). The short panel 246 and the sloped rear panel 230 extend between, and contact, rear edges of both the two side panels 228a, 228b. The sloped rear panel 230 in the illustrated implementation has a pair of openings 248a, 248b with removable covers 250a, 250b that are removable either by hand or with a tool and that serve as additional access ports to the interior of the discharge hopper's housing 220. Aside from the two openings 248a, 248b, the sloped rear panel 230 in the illustrated implementation extends to and between the short panel 246, the bottom panel 234, and the two side panels 228a, 228b. The inner surfaces of the short panel 246 and the sloped rear panel 230 are perpendicular to the inner surfaces of the two side panels 228a, 228b.

The bottom panel 234 in the illustrated implementation extends in a forward direction from a bottom edge of the sloped rear panel 230 to a bottom portion of the discharge hopper's discharge chute 252. The bottom panel 234 also extends between, and contacts, bottom edges of the two side panels 228a, 228b. In a typical implementation, the bottom panel 234 has a continuous, substantially smooth, flat, and horizontally-disposed inner surface, typically with no openings. The inner surface of the bottom panel 234 is perpendicular to the inner surfaces of the two side panels 228a, 228b. The angle between the inner surface of the bottom panel 234 and the majority of the sloped rear panel 230, according to the illustrated implementation, is 135 degrees. Of course, this angle may be different than 135 degrees. In various implementations, the angle may be any angle within a range of angles (e.g., 130 degrees to 140 degrees, 125 degrees to 145 degrees, 120 degrees to 150 degrees, etc.).

The front panel 232, in the illustrated implementation, has a vertical portion 232a that extends in a vertically downward direction from a front part of the flanged surface 226, a first sloped portion 232b that extends forward in a downwardly-sloped manner from a bottom edge of the vertical portion 232a forward, and a second sloped portion 232c that extends rearward in a downwardly-sloped manner from bottom edges of the first sloped portion 232b. A short rectangular extension 252 extends out from the second sloped portion 232a to a flanged opening that serves as the outlet 224 of the discharge hopper 109.

An elongate, rectangular channel 254 is coupled to the outer surface of the front panel 232 near the bottom of the vertical portion 232a of the front panel 232. The channel 254, in the illustrated implementation, extends laterally across the front panel horizontally. The channel 254 may be coupled to the outer surface of the front panel in any number of ways. In one exemplary implementation, the channel 254 may be welded to the outer surface of the front panel. The channel 254 in the illustrated implementation has a length that is larger than the distance between the outer surfaces of the two side panels 228a, 228b and is positioned relative to the housing 220 such that the channel 254 extends beyond the side edges of the front panel 232, equidistant on both sides.

Support pads 256a, 256b are provided at each end of channel 254. Each support pad 256a, 256b, in the illustrated implementation, is a flat, rigid plate and is positioned beneath and coupled (e.g., by a weld) to the channel 254. Each support pad 256a, 256b, in the illustrated implementation, lies in a horizontal plane and has a plurality of holes that extend in a vertical direction through the support pad 256a, 256b. The holes may be configured to receive mounting bolts or other fastening elements. A third support pad 256c is provided at an external surface at the rear of the discharge hopper 109. The third support pad 256c also is a flat, rigid plate that lies in a horizontal plane and has a plurality of holes that extend in a vertical direction through the support pad 256c. The third support pad 256c is centrally located along the rear surface of the discharge hopper housing 220 equidistant from each of the side panels 228a, 228b. The third support pad 256c is positioned beneath and coupled (e.g., by a weld) to a solid surface on the housing 220.

In a typical implementation, the first, second, and third support pads 256a, 256b, 256c are located such that their flat bottom surfaces all lie in a common horizontal plane. Moreover, they are arranged relative to one another in a triangular arrangement when viewed from above, for example—specifically, they are arranged in an equilateral triangular pattern, when so viewed.

A plurality of lugs 258 are provided on the outer surface of the discharge hopper 109. These lugs are configured to facilitate lifting of the discharge hopper 109 for placement within system 100, for example.

Figure 3A:
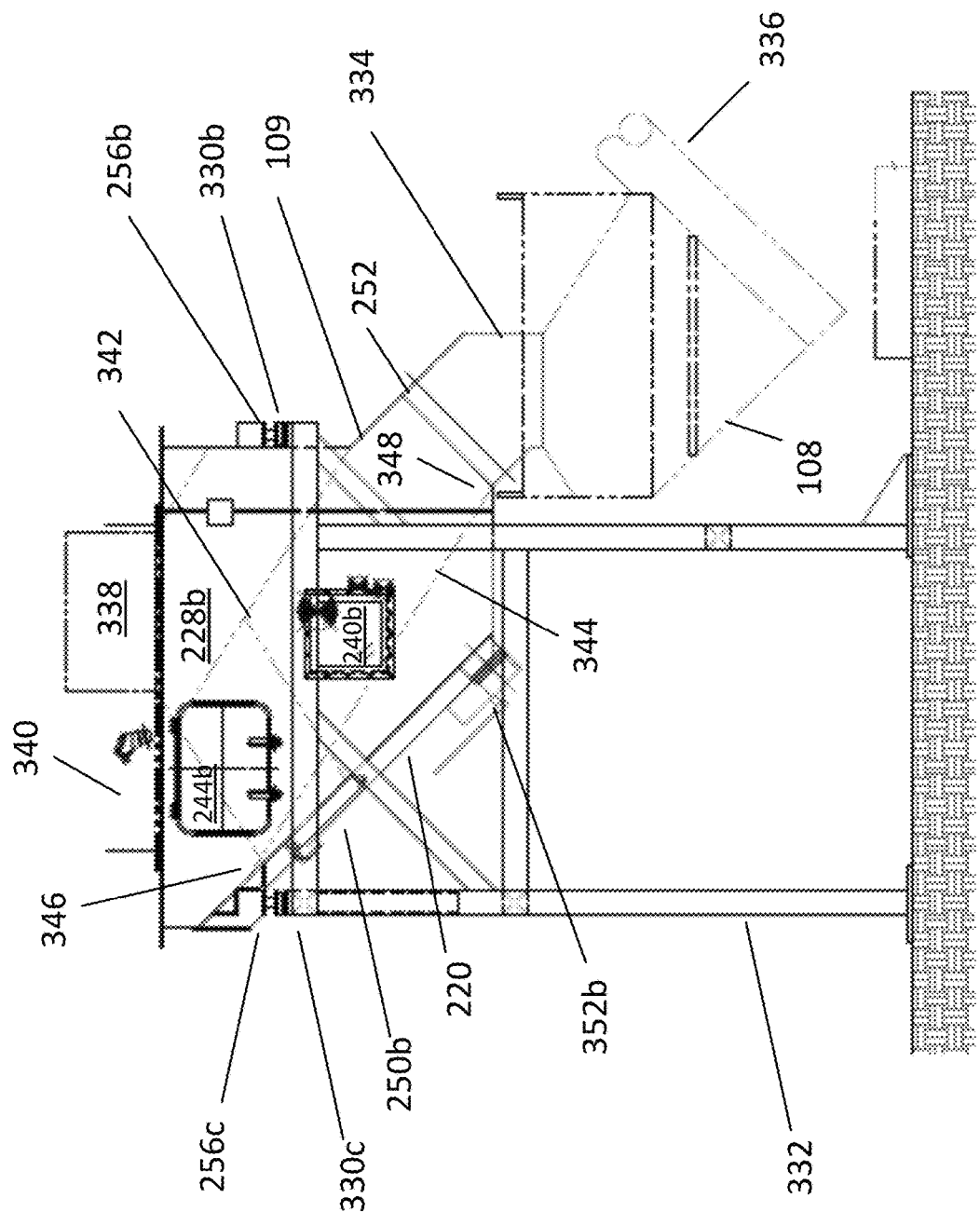
FIG. 3A is a side view of an implementation of a discharge box mounted on a support frame via load cells and configured to direct proppant from the outlet of a mechanical conveyor to the inlet of a blender hopper.
Figure 3B:
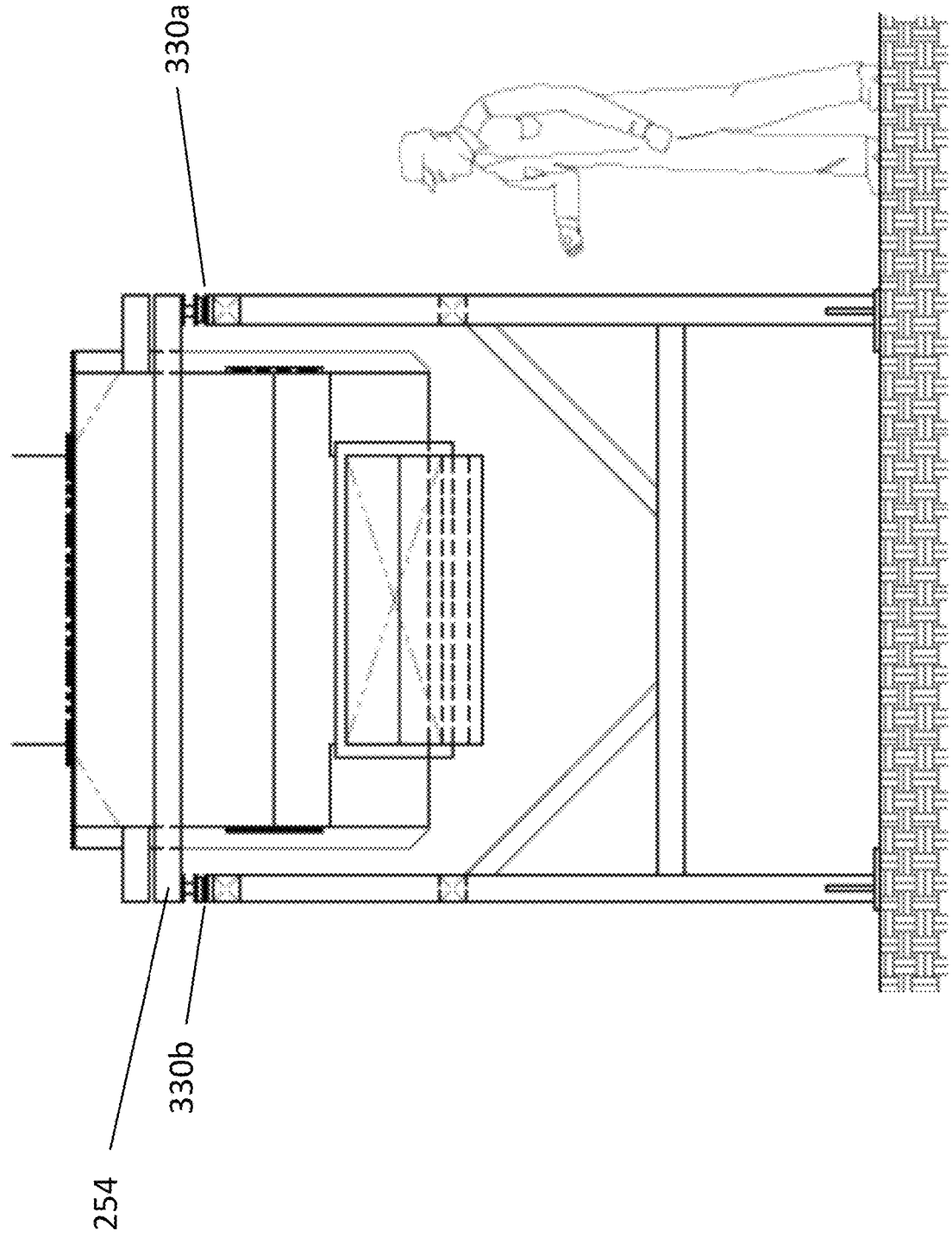
FIG. 3B is a partial front view of the discharge box configuration from FIG. 3A.
Figure 3C:
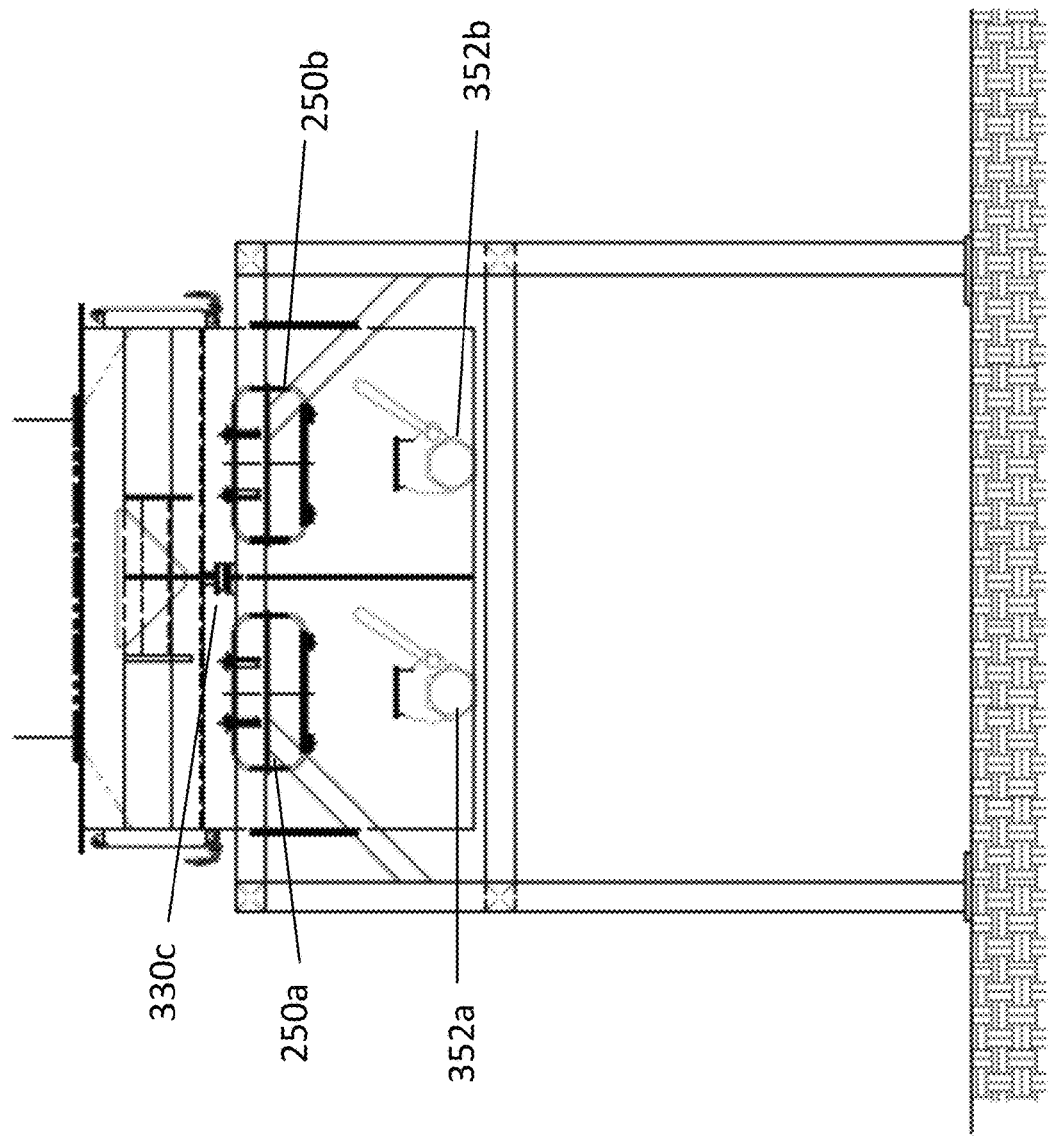
FIG. 3C is a rear view of the discharge box configuration from FIG. 3A.

FIGS. 3A-3C show a detailed view of an exemplary implementation of part of the system 100 from FIGS. 1A and 1B. Specifically, the view shows the discharge hopper 109 and the blender hopper 108, with the discharge hopper 109 configured to feed proppant into the blender hopper 108.

The discharge hopper 109 is supported at each respective one of its support pads 256a, 256b, 256c by a load cell 330a, 330b, 330c. The load cells 330a, 330b, 330c are force transducers. In this regard, each load cell 330a, 330b, 330c is configured to convert a force (e.g., a compressive force from the collective weight of the discharge hopper 109 and any proppant contained within and/or moving through—e.g., along a surface inside—the discharge hopper) into a signal (e.g., an electrical signal) that can be measured and acted upon. Typically, as the force applied to one of the load cells 330a, 330b, 330c increases, the signal produced by that load cell changes proportionally. Thus, as more or less proppant moves through (and impinges on, e.g., the sloped surface inside of) the discharge hopper 109, the signal produced by the load cells 330a, 330b, 330c may increase or decrease, accordingly. The load cells 330a, 330b, 330c can be virtually any one of a variety of different types of force transducers. In one exemplary implementation, the loads cells are RL90000 Alloy Steel, Compression Disk Load Cells, available from the Rice Lake® Weighing Systems company.

In the illustrated implementation, the discharge hopper 109 is physically supported, in its entirety, by the load cells 330a, 330b, 330c, and the load cells are physically supported by and sit atop a support frame 332. The support frame 332, in the illustrated example, includes a plurality of structural support elements, arranged in a particular manner to provide physical support for the load cells and discharge hopper 109, under any and all design operating conditions-regardless of how much proppant may be contained within or moving through the discharge hopper 109 at a particular moment. It is worth noting that, in the illustrated implementation, the entirety of the discharge hopper 109 is physically supported by the frame, through the load cells 330a, 330b, 330c, with no portion of the discharge hopper physically supported in any other manner or by any other support element(s) that do not include one of the load cells.

Once installed, the load cells 330a, 330b, 330c may be calibrated prior to system 100 operation to produce signals that represent only the amount of proppant contained within and/or moving through the discharge hopper 109 (and to not represent the weight of the discharge hopper itself). Thus, the load cells may be zeroed out (i.e., set so that they produce a signal of zero volts or zero amps) when the discharge hopper 109 is empty. In those instances, any signal produced by the load cells would be indicative of, and proportionate to, the presence and amount of proppant contained within and/or moving through the discharge hopper 109.

The discharge hopper 109 in the illustrated implementation includes a chute extension 334 (that is also part of the discharge hopper 109 and, therefore, physically supported by the frame 332 via the load cells 330a, 330b, 330c). The chute extension 334 defines an extension path for the flow of proppant out from the discharge chute 252 of the discharge hopper 334. The extension path is configured to dump the proppant into the blender hopper 108 directly beneath its outlet.

The blender hopper 108 has a conveyor 336 that conveys proppant out of the blender hopper 108 into the blender 110. Conveyor 336 can be virtually any type of conveyor. In one example, conveyor 336 is a screw conveyor.

It is worth noting that each of the mechanical conveyor 117, the blender hopper 108 and the blender 110 are physically distinct components from the discharge hopper 109, and neither is physically supported via any of the load cells 330a, 330b, 330c.

The impact scale 336 is shown immediately upstream from and above an inlet 340 of the discharge hopper 109. In a typical implementation, the impact scale 336 is part of the mechanical conveyor 104.

FIG. 3A, for example, shows (with dashed lines) certain panels/surfaces inside the housing 220 of the discharge hopper 109. These surfaces define an internal proppant chute 342 that slopes in a downward direction from the rear of the discharge hopper 109 to the channel defined by, and within, elements 232b and 252. The internal proppant chute 342 in the illustrated implementation defines an enclosed chamber, within which proppant can flow along the sloped bottom surface of the internal proppant chute 342. The sloped bottom surface of the internal proppant chute 342 follows a linear slope, in the illustrated implementation, and, in a typical implementation, defines internal surface(s) that are substantially smooth to facilitate the flow of proppant therein.

The upper end of internal proppant chute 342 defines an upward-facing opening at the top of the discharge hopper 109 and near the rear of the discharge hopper 109. That opening serves as an inlet for proppant passing into the discharge hopper 109. Given the local geometry near the inlet, any proppant that flows through the inlet lands on the sloped bottom surface 344 inside the internal proppant chute 342. The proppant that lands on the sloped bottom surface 344 moves, largely under the influence of gravity, down the sloped bottom surface, into the chute extension 334, and out of the discharge hopper 109 via a downward facing opening in the chute extension. The proppant then enters the blender hopper 108.

The internal proppant chute 342 in the illustrated implementation has a rectangular cross section with a top, a bottom, and two sides. The top and bottom extend between and connect the two sides. Each of the two sides extends between and connects the top and bottom. The bottom defines the sloped bottom surface 344, which extends between the two sides. In a typical implementation, the sloped bottom surface 344 is continuous, smooth, and flat across its entirety (e.g., from side to side and from its upper edge (at 346) to its lower edge (at 348). Moreover, in a typical implementation, the sloped bottom surface 344 is perpendicular to the inner surfaces of the sides of the internal proppant chute 342. The angle between the sloped bottom surface 344 of the internal proppant chute 342 and horizontal, according to the illustrated implementation, is about 32 degrees. Of course, this angle may be different than 32 degrees. In various implementations, the angle may be any angle within any one of a variety of angular ranges (e.g., 30 degrees to 35 degrees, 25 degrees to 40 degrees, 20 degrees to 45 degrees, etc.), as long as the angle is sufficient to facilitate the flow of proppant along the sloped bottom surface from the inlet to the outlet of the discharge hopper 109.

As represented in FIG. 3A, for example, the first opening 240b in side panel 228b, which is covered by the transparent viewing window, is positioned so as to allow a human to see into the internal proppant chute 342 at and/or just above the sloped bottom surface 344 of the internal proppant chute 342. This positioning allows the human to determine and/or confirm whether proppant is flowing through the internal proppant chute 342. Additionally, it can be seen from FIG. 2A that the second opening 244b in side panel 228b, which is covered by an easily-removable cover is aligned with the internal proppant chute 342 as well. This positioning allows the human to access to the space inside the internal proppant chute 342 for maintenance, repair, etc., as needed.

Referring now to FIGS. 3A and 3B, there is a pair of gate valves at the bottom of the rear panel 230 of the discharge hopper 109. These gate valves are operable to open and close, where opening allows drainage of any fluid, for example, that may have collected inside the discharge hopper housing 220.

Figure 4:
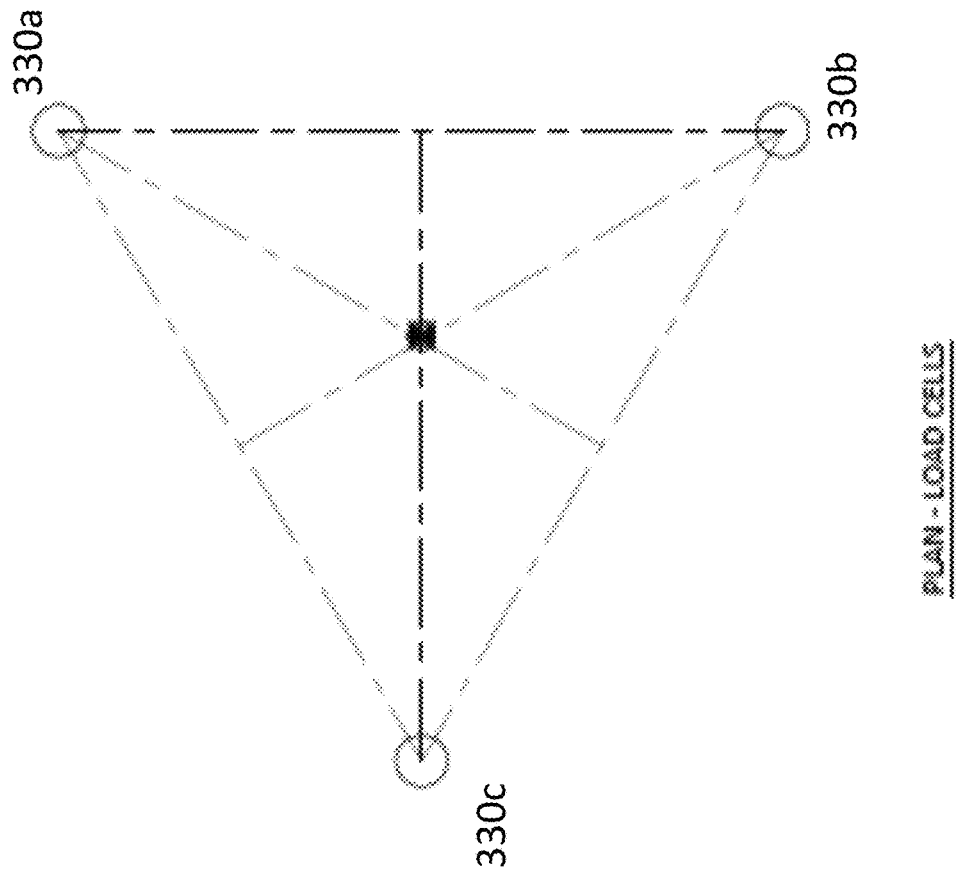
FIG. 4 is a schematic plan view representing an exemplary arrangement of load cells relative to one another in the system of FIGS. 1A and 1B.

FIG. 4 shows a schematic plan view of the arrangement of load cells (e.g., 330a, 330b, 330c) relative to one another. As shown, in the exemplary implementation, the load cells are arranged in a triangular pattern. More specifically, the arrangement forms an equilateral triangular pattern. This arrangement helps distribute the load across all load cells.

Figure 5:
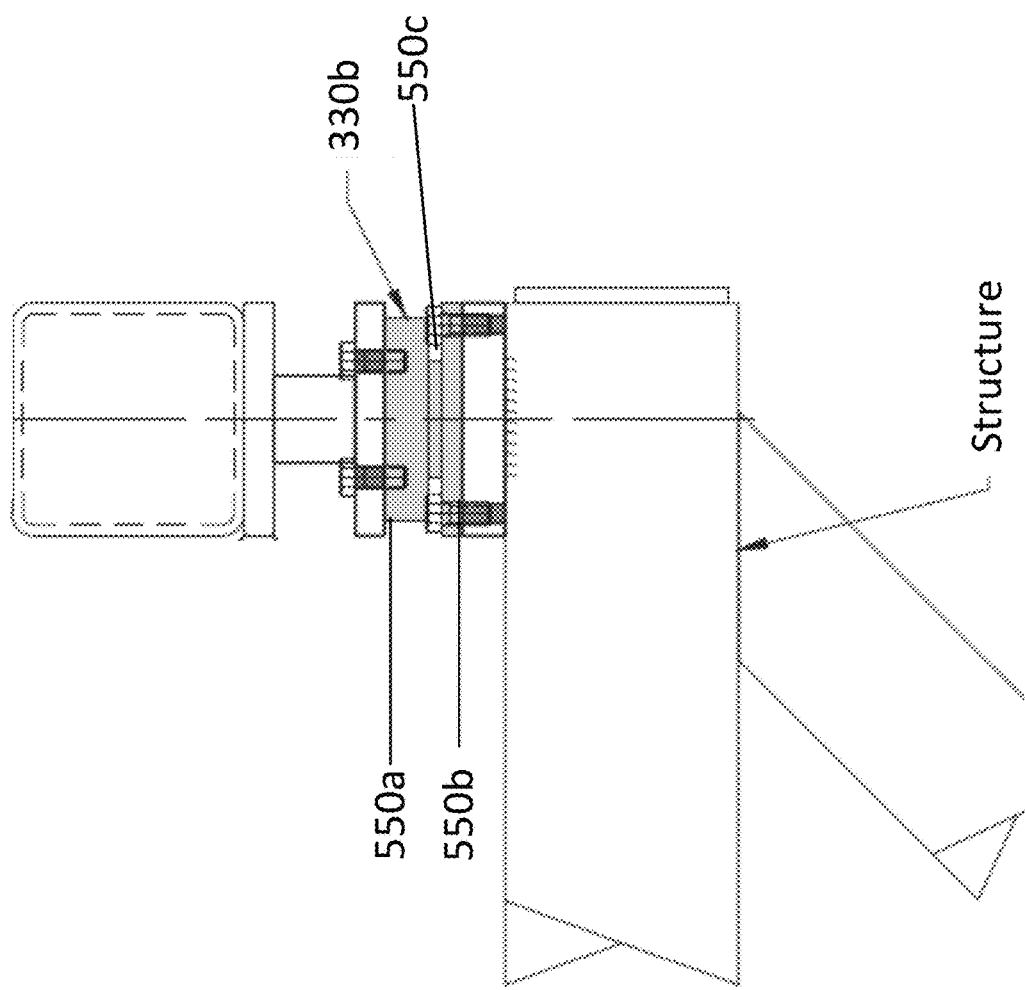
FIG. 5 is a detail view showing an implementation of a load cell physically supporting a portion of a discharge box.

FIG. 5 is a detail view showing one of the load cells (e.g., 330b) installed in system 100. The illustrated load cell includes an upper load plate 550a, and a lower base plate 550b, like the aforementioned RL90000 Load Cells. The upper load plate 550a has upwardly facing threaded openings, which, in the illustrated implementation, are used to bolt the upper load plate 550a to a structural support for the discharge hopper. The lower base plate 550b has openings to receive bolts that are used to connect the lower base plate 550b to a structural support element of the frame beneath it.

Figure 6:
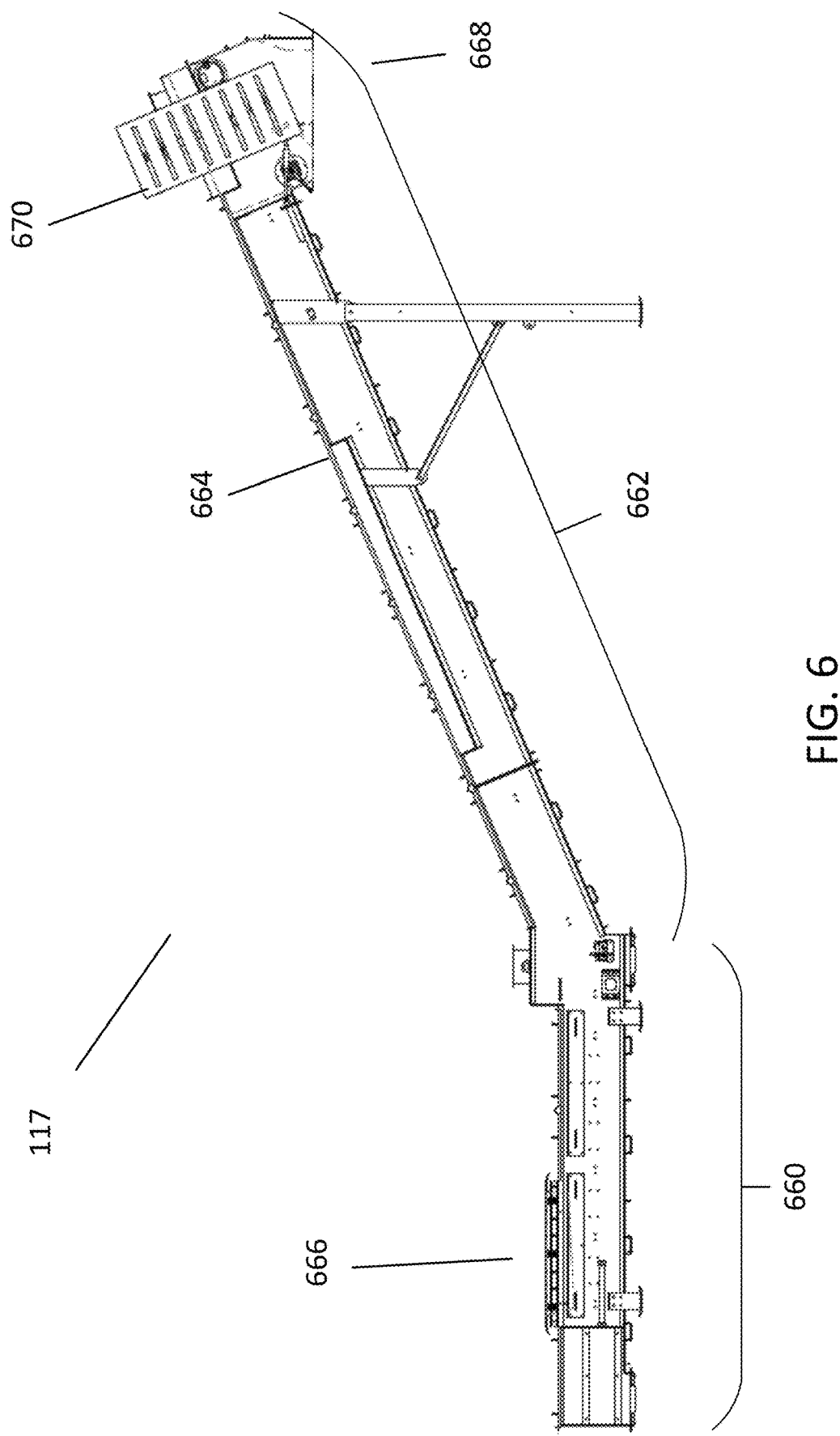
FIG. 6 is a side view of an implementation of the mechanical conveyor from the system in FIGS. 1A and 1B.

FIG. 6 is a side view showing an implementation of the mechanical conveyor 117 from system 100. The illustrated mechanical conveyor 117 has a first section 660 that is substantially horizontal and a second section 662 that is sloped in an upward manner relative to the first section 660. The illustrated mechanical conveyor 117 has a housing 664 that defines an opening 666 in an upper surface of the first section 660 of the housing 664. The opening 666 serves as an inlet for proppant to the mechanical conveyor 117. The mechanical conveyor 117 includes conveying means (e.g., one or more conveyor belts inside the housing 664) to convey proppant from a position just inside the proppant inlet to a discharge port 668 at the distal end of the second section 662 of the housing.

The mechanical conveyor 117 has a drive assembly 670 for the one or more conveyors (e.g., conveyor belt(s)) inside the housing 222. The drive assembly 670, in a typical implementation, includes an electrical motor to move the one or more conveyors, and a variable speed drive (e.g., a variable frequency drive, such as one of the Rsi S Series low voltage variable frequency drives, from the Benshaw® Advanced Controls & Drives company) to drive the electrical motor at a variable speed, where the value of the variable speed is determined based on signals produced by the load cells 330a, 330b, 330c. Additionally, in a typical implementation, the electrical motor that drives the one or more conveyors may be turned on and off based on signals produced by one or more level sensors in the proppant holding container 112 of the proppant receiver 102.

Figure 7:
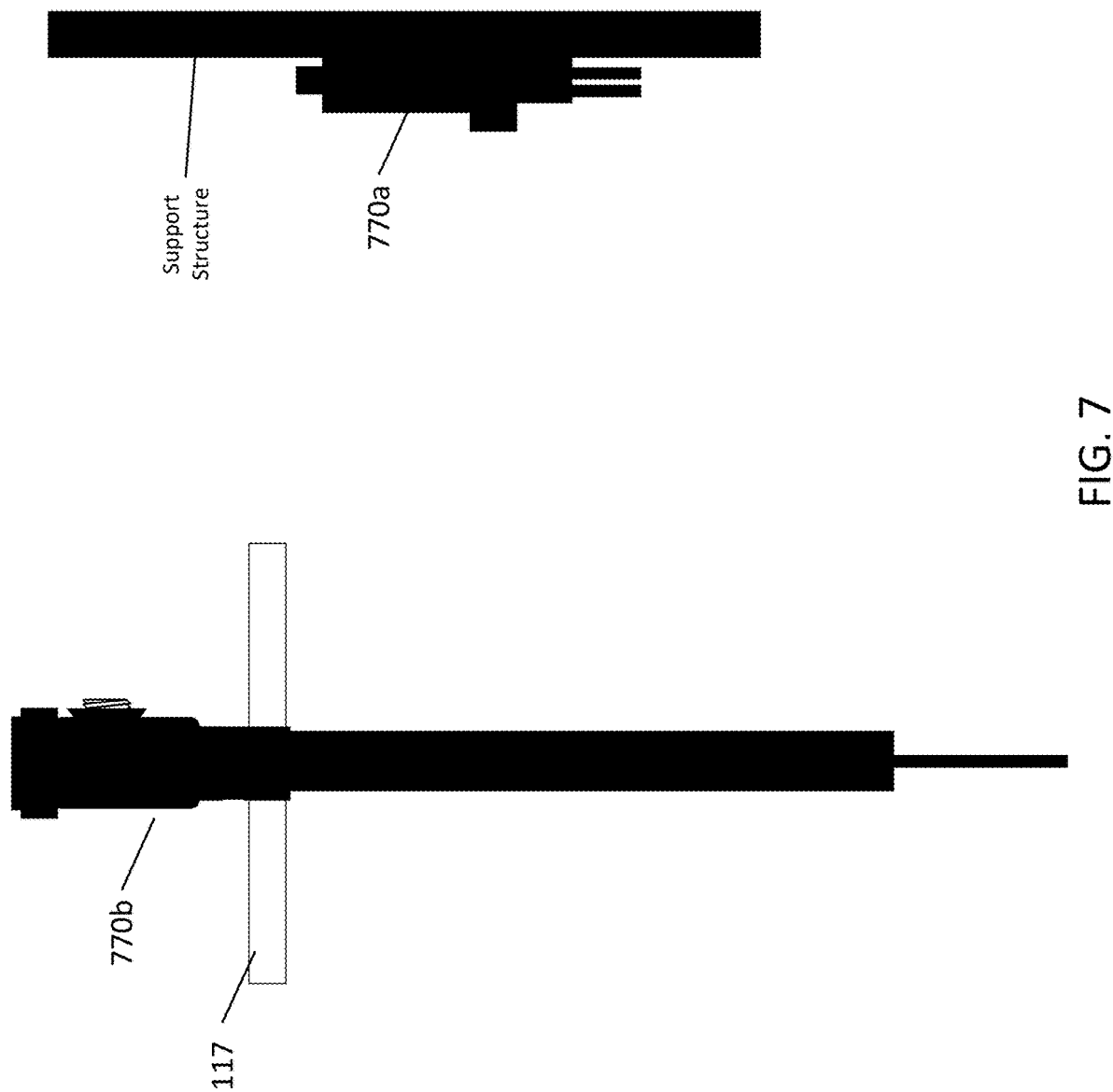
FIG. 7 include detail views of level sensors in a proppant storage container in the system of FIGS. 1A and 1B.

FIG. 7 includes schematic representations of exemplary level sensors 770a, 770b that may be provided in the proppant holding container 112 of the proppant receiver 102. The level sensors 770a, 770b typically are located at different places within the proppant storage space of the proppant holding container 112.

Level sensor 770a is a high-level sensor and, as such, is typically positioned at a height within the proppant storage container 112 such that, if the proppant were to reach that height, the level sensor 770a would sense the proppant and produce a signal indicating the proppant storage space inside the proppant storage container 112 is full. In a typical implementation, this signal would cause the motor on the mechanical conveyor 117 to pause (or stop running), thus ceasing operation of the mechanical conveyor 117. In those instances, once the proppant level drops below that height—or below a lower height designated by a lower level sensor—the level sensor reacts in a manner that causes the motor on the mechanical conveyor 117 to restart, thereby, reactivating the mechanical conveyor 117. As shown in the figure, level sensor 770a is mounted to a structural element (e.g., a bar, rod, panel, or the like) inside the proppant storage container 112.

Level sensor 770b is mounted on an external (e.g., upper) panel 772 of the proppant storage container 112 and has an elongate body with a sensing element at a distal (lower) end thereof. As shown in the illustrated example, the elongate body extends from its mounting position (e.g., on an upper panel of the proppant storage container housing) into the proppant storage space inside the proppant storage container 112. The position of the sensing element (at the lower distal end of level sensor 770b) determines a first predetermined level, at which, a low-level condition would exist in the proppant storage container 112. Specifically, if the proppant level in the proppant storage container 112 dropped below the position of the sensing element in level sensor 770b and thereby uncovered the sensing element, the level sensor 770b produces a signal indicating the existence of a low level in the proppant storage container 112. A low-level condition in the proppant storage container 112 may result from one or more missed truck deliveries or other problems effectively introducing proppant into the system 100.

Once the level sensor 770b produces the signal indicating the existence of the low level in the proppant storage container 112, the signal typically causes the mechanical conveyor 117 to pause operations and causes one or more of the silos 106a-106d to start delivering proppant into the blender hopper 108. The signal may cause the one or more silos 106a-106d to start delivering proppant into the blender hopper 108 by causing a valve (e.g., an electrical solenoid valve) in a discharge line(s) of the one or more silos 106a-106d to open automatically in response to the signal produced by the level sensor 770b. Once a discharge valve on a silo has been opened, proppant is free to flow, under the influence of gravity, from the corresponding silo into the blender hopper 108 to maintain proppant supply therein. In a typical implementation, the signal from the level sensor 770b indicating the low-level condition in the proppant storage container 112 also causes the motor on the mechanical conveyor 117 to pause, thereby ceasing operation of the mechanical conveyor 117.

In a typical implementation, proppant continues to flow from the designated one or more silos into the blender hopper 108 until the proppant level in the proppant storage container 112 has been restored. Typically, this happens when one or more proppant deliveries have been successfully completed, via truck, to the proppant receiver 102. In a typical implementation, the proppant level may be considered restored, for example, when the proppant level in the proppant storage container has reached and covered the sensing element on level sensor 770b. In some implementations, the proppant level may be considered restored when the proppant level reaches a second predetermined level that is different than the first and that is determined by a different level sensor.

Once the proppant level in the proppant storage container 112 has been restored (e.g., filled to the predesignated level), the level sensor causes the solenoid valve in the silo discharge line to close automatically and causes the mechanical conveyor 117 to resume drawing proppant from the proppant storage container 112 for delivery to the blender hopper 108. Subsequently, the system 100 may automatically (or under the operational influence of a human user) replenish the proppant in the one or more silos, as appropriate, using the pneumatic conveying system 111 to convey proppant from the proppant storage container 112 into the one or more silos.

Figure 8:
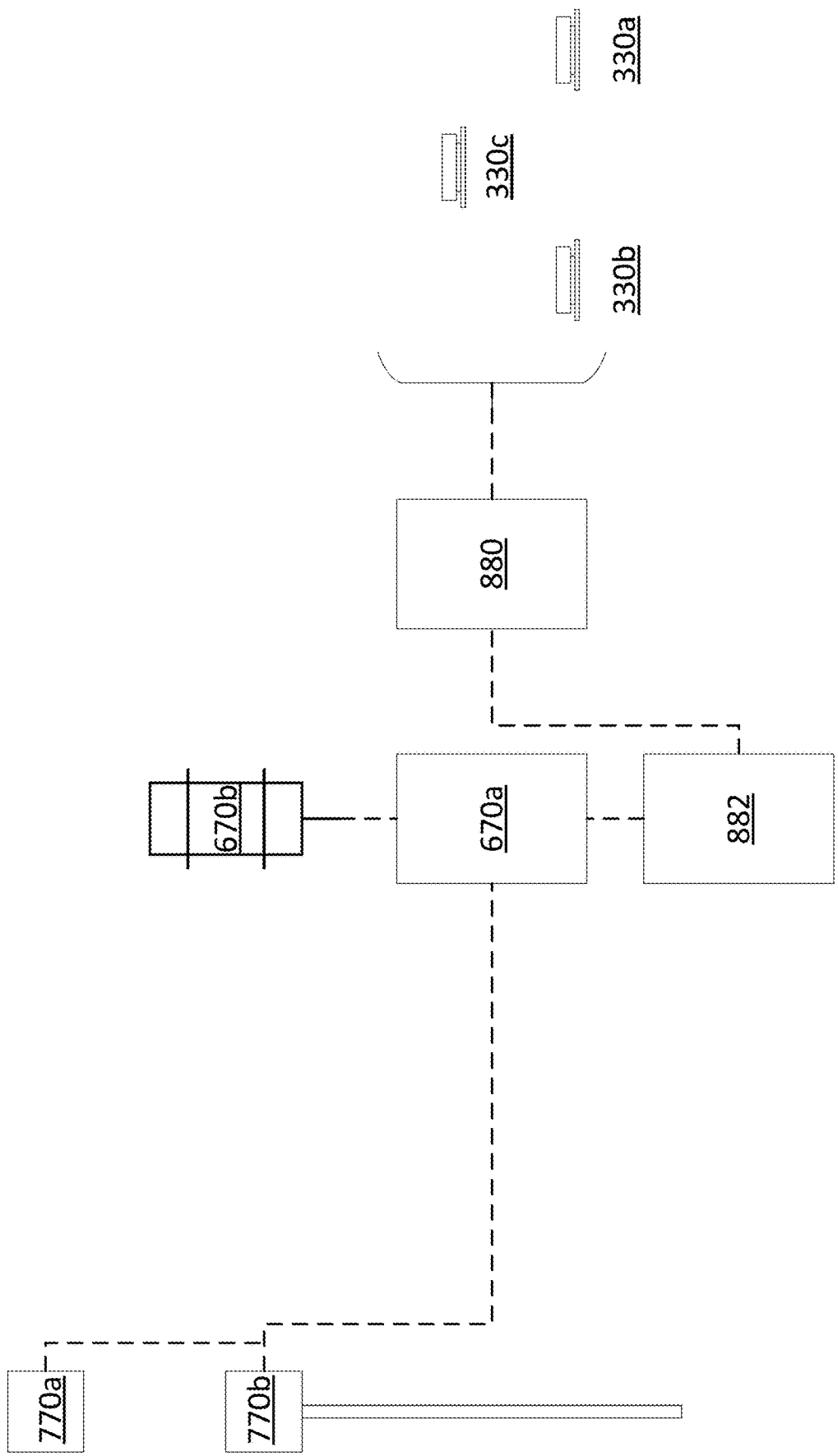
FIG. 8 is a schematic circuit diagram showing an implementation of a control system for a conveyor drive system in the system of FIGS. 1A and 1B.

FIG. 8 is a schematic representation of an exemplary circuit diagram showing the load cells 330a, 330b, 330c, a signal combiner 880, level sensors 770a, 770b for the proppant storage container 112, drive assembly 670 (which includes a variable frequency drive 670a and an electrical motor 670b) for the mechanical conveyor 117, and a controller 882.

In the illustrated implementation, the drive assembly 670 is controlled by the controller 882, whose operation is influenced, as described herein, by signals produced by the load cells 330a, 330b, 330c and by the level sensors 770a, 770b. Specifically, in the illustrated implementation, the signals from the load cells 330a, 330b, 330c are combined at the signal combiner 880. There are a number of ways in which the signals may be combined to produce a single load cells signal. In one implementation, for example, the signal combiner 880 receives the signal values from the load cells 330a, 330b, 330c and calculates an average of the signals. Other approaches are possible as well. The signal combiner 880 may be implemented, for example, by computer-readable instructions stored on a computer-readable medium that, when executed by a computer processor cause the computer processor to calculate the combined signal (e.g., the average value of the load cell signals). The signal combiner 880, in the illustrated implementation, is connected to a controller 882 that is configured to control the drive assembly 670 of the mechanical conveyor 117, in accordance with the processes disclosed herein. The controller 882 also receives signals produced by the level sensors 770a, 770b and further controls drive assembly 670 operations in response to such signals and in accordance with the disclosures set forth herein.

A number of embodiments of the invention have been described. Nevertheless, it will be understood that various modifications may be made without departing from the spirit and scope of the invention.

The proppant can be any kind of proppant. Typically, a proppant is a solid material, typically sand, treated sand or man-made ceramic materials, designed to keep an induced hydraulic fracture open, during or following a fracturing treatment. It may be added to other substances to produce fracking fluid which may vary in composition depending on the type of fracturing used, and can be liquid-based, gel-based, foam-based, etc.

In various implementations, the mechanical conveyor 104 may utilize various different types of conveying mechanisms. In the illustrated implementation, the mechanical conveyor 104 utilizes a belt conveyor. In other configurations, however, the mechanical conveyor 104 may utilize other types of mechanical conveying mechanisms, such as screw conveyors, bucket conveyors, etc.

The size, shape, and configuration, relative and absolute, of the system and its various components can vary considerably. Materials can vary as well.

The system can be implemented with any number (one or more) of silos. The system can be implemented with other types of proppant receivers. The arrangement of control elements can vary as well.

As mentioned above, in certain implementations, the proppant unloading system 102 may be a SmartPath™ unloading system, available from Smart Sand, Inc., the applicant of the current patent application, adapted to include the features disclosed herein. Various aspects of the SmartPath™ unloading system (or "material handling system"), and variations thereof, are described in U.S. Patent Application Publication No. 2022/0017310, entitled Flow Control for Bottom Dump Pneumatic Material Handling, which is incorporated by reference herein in its entirety.

In some implementations, one or more of the components described herein as being integrated into one overall assembly, may be physically separate from each other (and not physically integrated). For example, in some implementations, the drive over conveyor may be provided as a separate piece of equipment from the other system components. In those implementations, a mechanical conveyor of the proppant receiver would be provided to mechanically convey material from the drive over conveyor to the separate container. As another example, blowers or air compressors may be provided as separate pieces of equipment. In those implementations, the blowers would be connected to the air locks at the bottom of the storage container by pneumatic lines. In general, any system component(s) provided on a separate base (e.g., not mounted on the same chassis as the other system components) would be operationally connected into the system (and to the other system components) as shown in the drawings and otherwise described herein to the other system components. In some implementations, more than one of the system components may be provided as a physically discrete component (and not mounted on the same chassis as the other system components).

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

The systems described herein are material handling systems and the techniques described herein relate generally to material handling. This is suitable for handling proppant (e.g., sand, treated sand, or man-made ceramic materials) designed to keep induced hydraulic fractures open, during or following a fracturing treatment, or to handle any one of various other types of solid materials (e.g., any bulk powder or granular material; sand, grain, cement, powdered chemicals, salt, etc.)

The systems and techniques are useful at a worksite (e.g., one that includes one or more hydraulic fracturing wellheads). The worksite need not have actual wellheads in place though. Instead, a worksite could be a location where fracking is intended to take place, but where not wellheads are in place yet. The worksite could also be at a temporary storage location. The worksite could also be at a material processing site. The system could work for any bulk powder or granular material; sand, grain, salt, etc.

The systems described herein is portable. Portability, however, may be provided for in a variety of other ways than just those explicitly mentioned herein.

Other implementations are within the scope of the claims.

What is claimed is:

1. A method comprising:
   receiving a continuing supply of proppant from a proppant conveyor through an inlet of a discharge box;
   enabling the continuing supply of proppant to move through the discharge box on one or more surfaces within the discharge box between the inlet and the outlet of the discharge box;
   repeatedly obtaining signals from a first plurality of load cells physically supporting the discharge box while the proppant moves through the discharge box, wherein each of the signals represents a weight, at a corresponding moment, of the discharge box and the proppant inside the discharge box; and
   controlling a speed of the proppant conveyor automatically based on the signals from the first plurality of load cells.

2. The method of claim 1, wherein the proppant conveyor is physically supported independent from the discharge box.

3. The method of claim 1, wherein each of the first plurality of load cells is beneath the discharge box.

4. The method of claim 3, wherein the first plurality of load cells comprises three spaced apart load cells, and wherein each respective load cell is in physical contact with and supported by a support pad on a support frame for the discharge box.

5. The method of claim 3, wherein the inlet of the discharge box is an opening at a top of the discharge box configured to receive the continuing supply of proppant via a gravity drop from an outlet of the proppant conveyor,
   wherein the outlet of the discharge box is an opening at a bottom of the discharge box, and
   wherein the outlet of the discharge box is at least partially offset in a horizontal direction from the inlet of the discharge box.

6. The method of claim 5, wherein enabling the continuing supply of proppant to move through the discharge box on the one or more surfaces within the discharge box between the inlet and the outlet of the discharge box comprises:
   enabling the continuing supply of proppant to land on a first portion of a surface inside the discharge box after passing through the inlet, slide along a downwardly slanted second portion of the surface under the influence of gravity to the outlet of the discharge box, and then exit the discharge box through the outlet.

7. The method of claim 6, further comprising:
   capturing the continuing supply of proppant exiting the discharge box through the outlet of the discharge box into a blender hopper beneath the outlet of the discharge box.

8. The method of claim 7, further comprising:
   providing a plurality of silos adjacent to the blender hopper, wherein each silo is configured to deliver proppant into the blender hopper via gravity through a silo discharge chute.

9. The method of claim 8, further comprising:
   receiving repeated proppant deliveries from a sequence of delivery trucks in a proppant receiving system configured to temporarily hold the proppant in a proppant storage container;
   gravity dropping the proppant from the proppant storage container onto the proppant conveyor;
   monitoring a proppant level in the proppant storage container with a first proppant level sensor inside the proppant storage container.

10. The method of claim 9, further comprising:
    pausing operation of the proppant conveyor automatically in response to an indication from the first proppant level sensor that the proppant level in the proppant storage container has dropped to a first level.

11. The method of claim 10, further comprising:
    restarting operation of the proppant conveyor automatically in response to an indication from the first proppant level sensor that the proppant level in the proppant storage container has been restored.

12. The method of claim 9, wherein the proppant receiving system comprises:
    a proppant unloading station;
    a mechanical conveying system configured to convey proppant from the proppant unloading station to a discharge that is higher than the proppant unloading station; and
    the proppant storage container with an inlet opening configured to receive proppant from the discharge of the mechanical conveying system and to temporarily hold the proppant,
    the method further comprising:
      receiving proppant from one of the repeated proppant deliveries in the proppant unloading station of the proppant receiving system; and
      conveying the proppant from the proppant unloading station to the inlet of the proppant storage container.

13. The method of claim 12, further comprising:
    conveying the proppant from the proppant storage container to the discharge box with the proppant conveyor, wherein the proppant passes through the discharge box and into the blender hopper.

14. The method of claim 13, further comprising:
    conveying the proppant from the proppant storage container to any one or more of a plurality of silos located adjacent to the blender hopper via a pneumatic conveyor system, wherein each of the plurality of silos has a discharge chute configured to discharge proppant into the blender hopper;
    sensing a proppant level in the proppant storage container with a second proppant level sensor inside the proppant storage container.

15. The method of claim 14, further comprising:
    causing one or more of the silos to deliver proppant into the blender hopper in response to the proppant level sensor indicating that the proppant level in the proppant storage container has dropped to a first predefined level.

16. The method of claim 15, further comprising:
    causing the proppant conveyor to stop in response to the proppant level sensor indicating that the proppant level in the proppant storage container has dropped to the first predefined level.

17. The method of claim 16, further comprising:
    causing the one or more silos to cease delivering proppant into the blender hopper and/or causing the proppant conveyor to restart in response to the proppant level in the proppant storage container becoming filled to a second predefined level.

18. The method of claim 1, wherein each of the load cells is a transducer that converts a compression force into a signal.

19. The method of claim 1, further comprising:
driving a motor for the proppant conveyor with an adjustable speed drive.

20. The method of claim 19, wherein controlling the speed of the proppant conveyor comprises:
transmitting an output signal from each of the first plurality of load cells to a computer-based controller;
producing a drive control signal, corresponding to the load cell output signals, at the computer-based controller; and
transmitting the drive control signal to the adjustable speed drive.

21. The method of claim 20, wherein producing the drive control signal at the computer-based controller comprises:
combining the load cell output signals from each of the first plurality of load cells to produce a combined signal, and
wherein the drive control signal is based on the combined signal.

22. The method of claim 1, wherein the proppant conveyor comprises an impact scale that comprises a second plurality of load cells, the method further comprising:
passing proppant from the continuing supply of proppant through the impact scale prior to exiting the proppant conveyor.

23. A proppant handling system comprising:
a discharge box;
a proppant conveyor configured to provide a continuing supply of proppant to a blender hopper via the discharge box;
wherein the discharge box comprises:
a housing that defines an inlet and an outlet; and
one or more surfaces inside the housing, wherein the one or more surfaces accommodate a flow of the proppant, under the influence of gravity, along the one or more surfaces through a portion of the discharge box between the inlet and the outlet; and
a plurality of load cells physically supporting an entirety of the discharge box,
wherein each of the plurality of load cells is configured to produce a time varying signal or sequence of signals that represents a time varying weight of the discharge box and a portion of the continuous supply of proppant inside the discharge box at specific times;
a control system configured to adjust a speed of a motor driving the proppant conveyor in response to and in accordance with the time varying signal or sequence of signals from the load cells.

24. The proppant handling system of claim 23, wherein the proppant conveyor is physically supported independently from the discharge box and without involvement from the plurality of load cells, the system further comprising:
the blender hopper, wherein the blender hopper is configured to receive proppant from an outlet of the discharge box and is physically supported independently from the discharge box and without involvement from the plurality of load cells.

25. The proppant handling system of claim 23, further comprising:
a proppant storage container configured to gravity dump proppant into the proppant conveyor; and
a first proppant level sensor inside the proppant storage container,
wherein the control system is configured to:
pause operation of the proppant conveyor automatically in response to an indication from the first proppant level sensor that a proppant level in the proppant storage container has dropped to a first level; and
restart operation of the proppant conveyor automatically in response to an indication from the proppant level sensor that the proppant level in the proppant storage container has been restored.

26. The proppant handling system of claim 23, further comprising:
a proppant storage container configured to gravity dump proppant into the proppant conveyor; and
a second proppant level sensor inside the proppant storage container,
wherein the control system is configured to:
cause one or more silos to deliver proppant into the blender hopper in response to the second proppant level sensor indicating that the proppant level in the proppant storage container has dropped to a first predefined level; and
cause the proppant conveyor to stop in response to the second proppant level sensor indicating that the proppant level in the proppant storage container has dropped to the first predefined level.

27. The proppant handling system of claim 26, wherein the control system is further configured to:
cause the one or more silos to cease delivering proppant into the blender hopper; and/or
cause the proppant conveyor to restart,
in response to the proppant level in the proppant storage container being restored.

28. The proppant handling system of claim 23, wherein the one or more surfaces inside the housing that accommodate the flow of the proppant comprise:
a first section beneath the inlet and configured to receive proppant that enters the housing through the inlet; and
a downwardly slanted section that connects the first section to a second section, wherein the second section is adjacent to the outlet.

29. The proppant handling system of claim 23, further comprising:
a support frame for the conveyor discharge box,
wherein the support frame defines a plurality of spaced-apart support pads, and
wherein each respective one of the plurality of loads cells sits atop a corresponding one of the support pads.

\* \* \* \* \*